(12) United States Patent
Sakagawa et al.

(10) Patent No.: US 7,046,838 B1
(45) Date of Patent: May 16, 2006

(54) THREE-DIMENSIONAL DATA INPUT METHOD AND APPARATUS

(75) Inventors: Yoshiko Sakagawa, Ibaraki (JP); Eiro Fujii, Takatsuki (JP); Koichi Shiono, Osaka (JP); Yuichi Kawakami, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/536,686

(22) Filed: Mar. 28, 2000

(30) Foreign Application Priority Data

Mar. 30, 1999 (JP) ............................... 11-087552
Mar. 30, 1999 (JP) ............................... 11-087553

(51) Int. Cl.
 *G06K 9/00* (2006.01)
(52) U.S. Cl. ..................................... 382/154; 345/419
(58) Field of Classification Search ................ 382/154, 382/284, 285, 294, 276; 345/419, 420, 629–631
See application file for complete search history.

(56) References Cited

U.S. PATENT DOCUMENTS

| | | | |
|---|---|---|---|
| 4,663,658 A * | 5/1987 | Lanne et al. | 348/95 |
| 5,822,450 A * | 10/1998 | Arakawa et al. | 382/152 |
| 5,990,895 A | 11/1999 | Fujii et al. | |
| 6,031,941 A * | 2/2000 | Yano et al. | 382/276 |
| 6,281,901 B1 * | 8/2001 | Firman et al. | 345/419 |
| 6,363,169 B1 * | 3/2002 | Ritter et al. | 382/154 |
| 2002/0081019 A1 * | 6/2002 | Katayama et al. | 382/154 |

* cited by examiner

*Primary Examiner*—Vikkram Bali
(74) *Attorney, Agent, or Firm*—McDermott Will & Emery LLP

(57) ABSTRACT

The three-dimensional data input method uses the three-dimensional data input apparatus that includes a monitor screen for confirming an object and is constructed to input the three-dimensional data of the object by shooting the object. In accordance with the three-dimensional data inputted from a part of the object Q, an image of the three-dimensional shape model that corresponds to the shape is generated. The image of the three-dimensional shape model is displayed on the monitor screen as a guide image for framing. The framing is performed so that the guide image is overlapped on the portion of the object image corresponding to the guide image, so that the object is shot after the framing is performed.

16 Claims, 13 Drawing Sheets

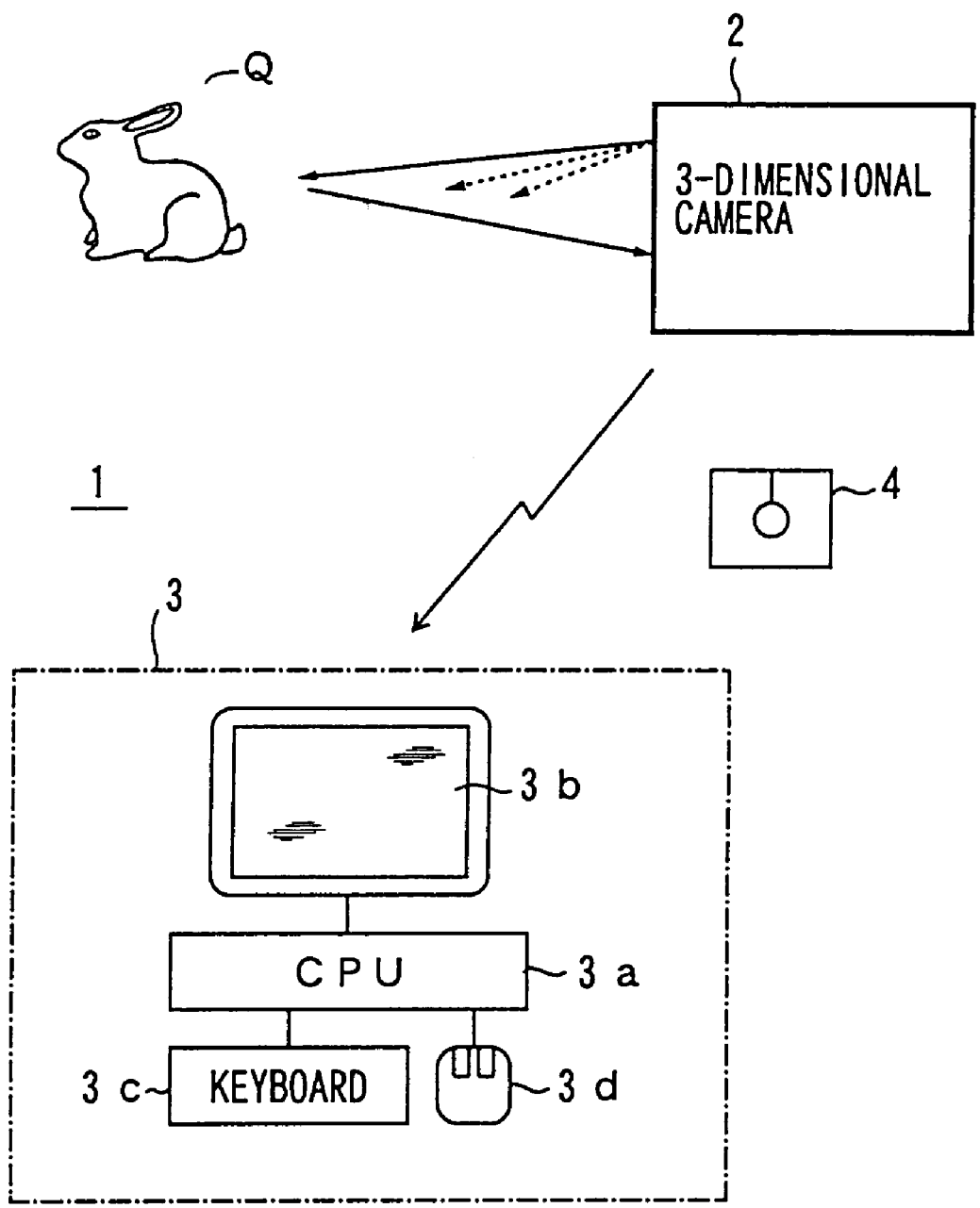

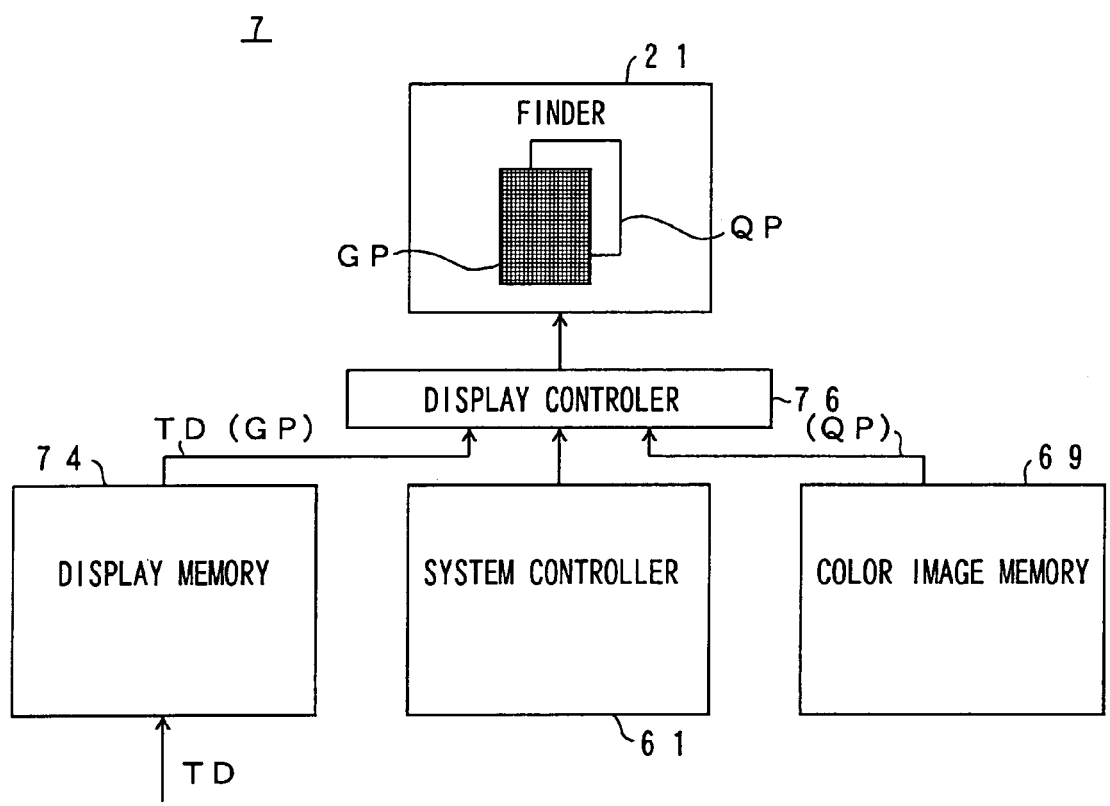

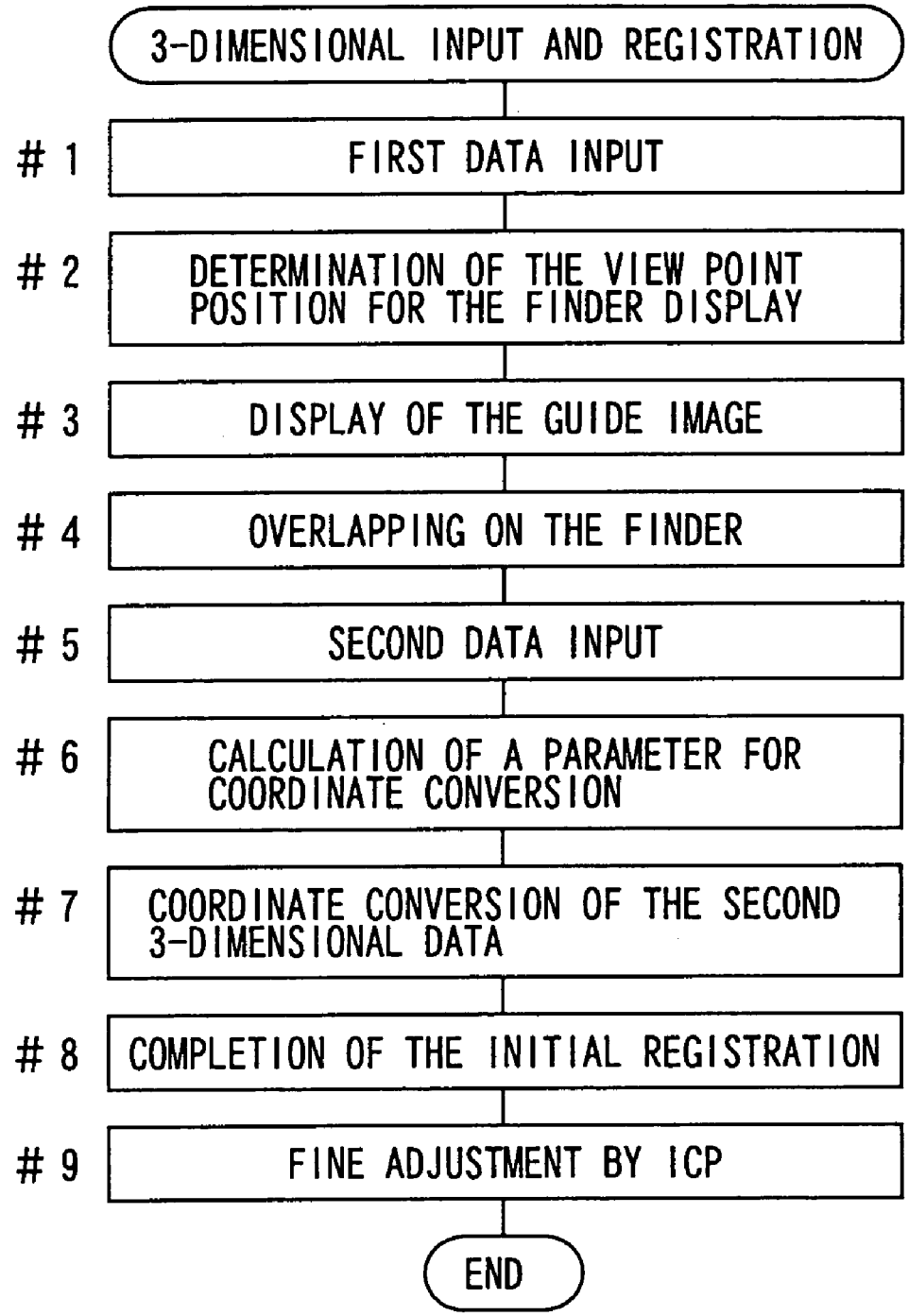

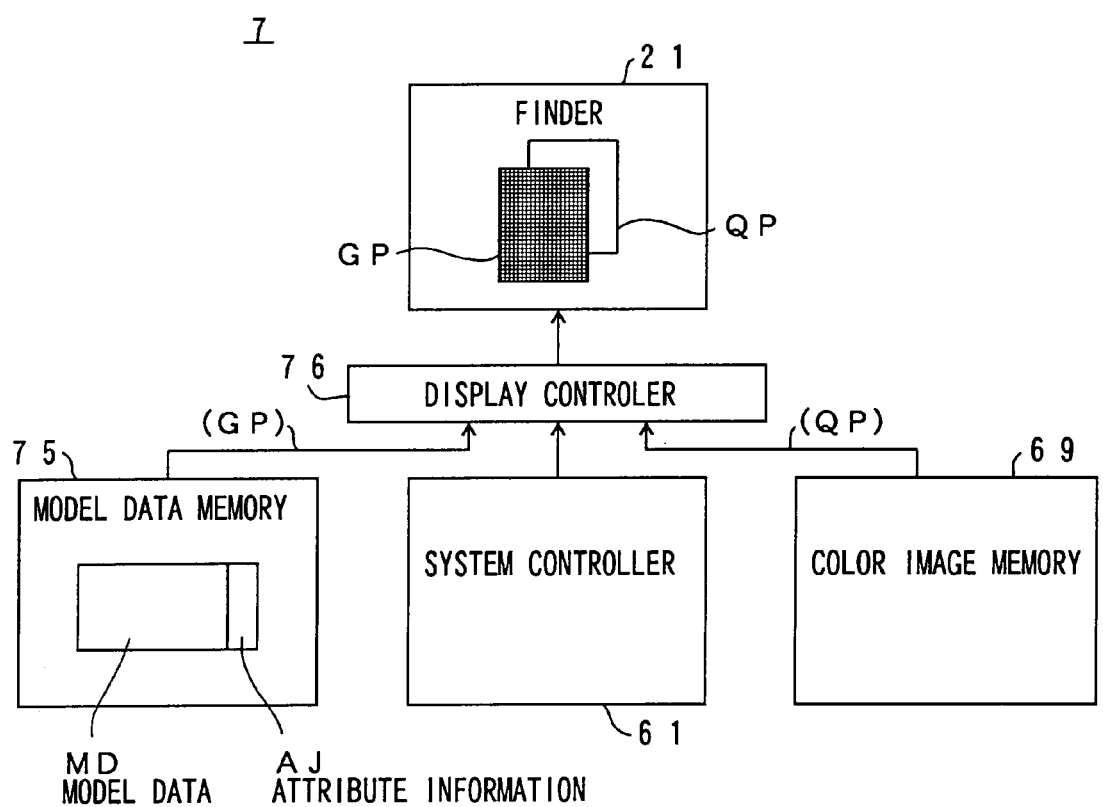

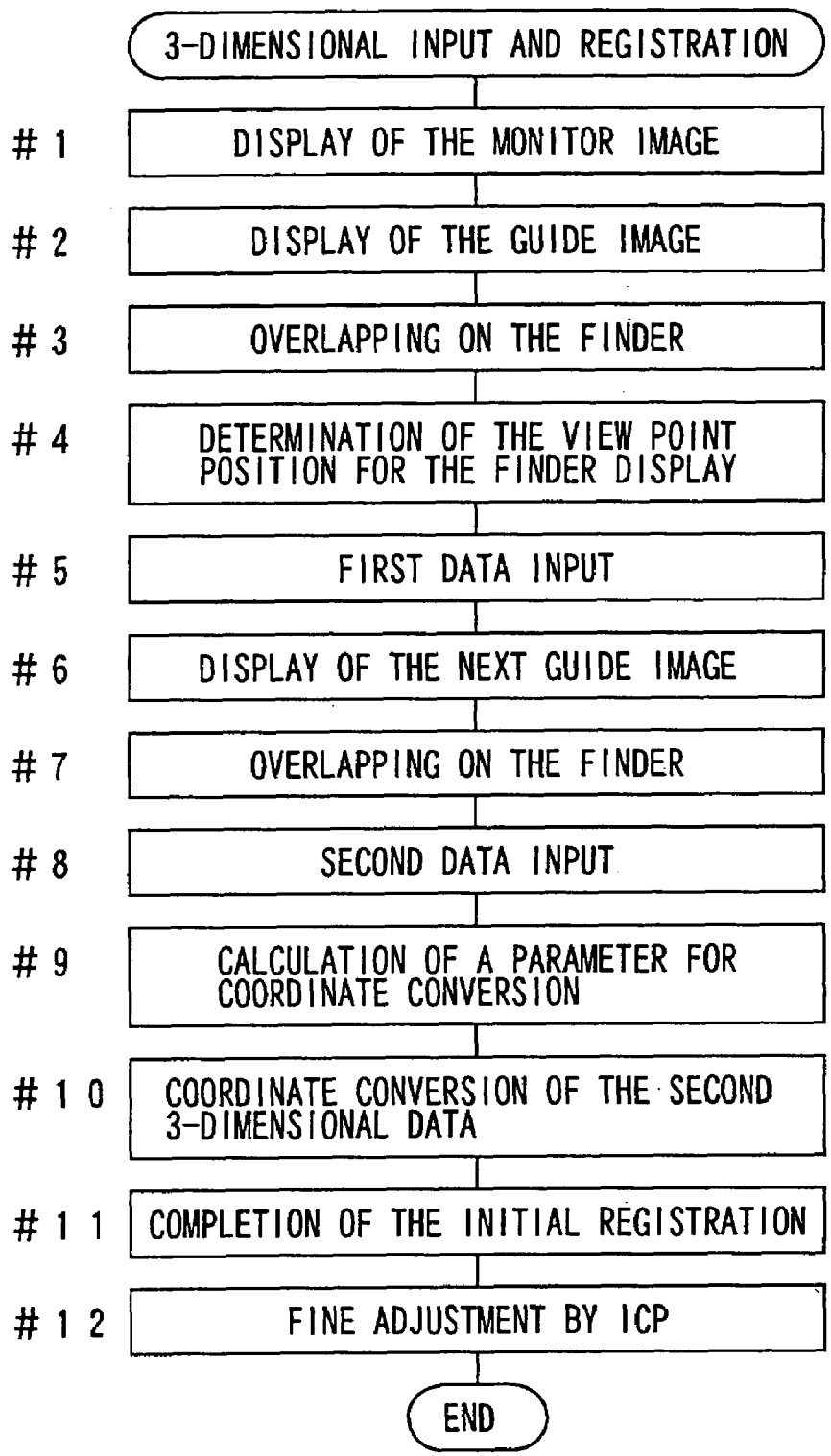

THREE-DIMENSIONAL DATA INPUT METHOD AND APPARATUS

This application is based on Japanese Patent Application No. 87552/1999 filed on Mar. 30, 1999 and No. 87553/1999 filed on Mar. 30, 1999, the contents of which are incorporated herein by reference.

BACKGROUND OF THE INVENTION

1. Field of the Invention

The present invention relates to a method and an apparatus for inputting three-dimensional data of an object.

2. Description of the Prior Art

An optical three-dimensional data input apparatus (a three-dimensional camera), which enables rapid measurement compared with a contact type, is used for data input into a CG system or a CAD system, physical measurement, visual sense of a robot or other applications. A slit light projection method (also referred to as a light cutting method) is known as the measurement method suitable for this three-dimensional data input apparatus.

FIG. 13 shows an input principle of a three-dimensional camera 80 utilizing the slit light projection method.

In FIG. 13, a three-dimensional camera 80 includes a light projection portion 81 and a light reception portion 82. The light projection portion 81 irradiates a slit light beam S having a linear section. The light reception portion 82 has an image sensing surface 83 and an imaging lens (not shown). The light projection portion 81 and the light reception portion 82 are separated from each other by a predetermined distance and are integrally installed in one housing.

The object Q1 is irradiated by the slit light beam S from the light projection portion 81, and the reflected light is captured on the image sensing surface 83 as a slit image. A space coordinate of the point p on the object Q1 corresponding to a point p' of this slit image is determined as the coordinates of the intersection point of the plane formed by the slit light beam S and the line L connecting the point p' and the center point 0 of the imaging lens. Therefore, the space coordinates of points on the surface of the object Q1 corresponding to the slit image are derived from one slit image obtained by the slit light beam S. The slit light beam S is moved horizontally so as to scan the object Q1 and the slit image at each scanning position is input. Thus, the three-dimensional data (three-dimensional shape data) of the front portion of the object Q1 are inputted, which is irradiated by the slit light beam S.

In order to obtain the three-dimensional data of the all-around surface of the object Q1, it is necessary to input from plural directions of the object Q1. Two methods are known for the purpose. In the first method, the three-dimensional camera 80 is moved on a predetermined track around the object Q1 while the shooting direction of the camera is directed to the object Q1 so as to take images of the object Q1 from plural directions. In the second method, a rotation stage is used on which the object Q1 is placed. The three-dimensional camera 80 is placed at a predetermined position for taking images of the object Q1 from plural directions.

The plural sets of three-dimensional data of the object Q1 taken from plural directions are processed for registration using a conversion parameter derived from a position on the track along which the three-dimensional camera 80 moves or the position of the rotation stage. Thus, the three-dimensional data of the all-around surface of the object Q1 are obtained.

However, the above-mentioned method causes a high cost since the position of the three-dimensional camera 80 or the angular position of the rotation stage should be detected in high accuracy for improving the registration accuracy.

In addition, since the three-dimensional camera 80 should be placed on a moving device, it is impossible to take images with holding the three-dimensional camera 80 in hand. Accordingly, the object that can be inputted is limited. Namely, the object such as a stone or bronze statue that cannot be moved cannot be inputted as the three-dimensional data by this method.

An apparatus that can solve this problem is disclosed in U.S. Pat. No. 5,990,895. This apparatus can take images of the object Q1 from any direction for inputting three-dimensional data. After inputting, three-dimensional shapes inputted from plural directions as well as a color image inputted simultaneously from the same view and corresponding to the three-dimensional data are displayed. A user designates corresponding points in the three-dimensional shape manually viewing the displayed color image, in accordance with a variation of color or other factors. The registration among the inputted three-dimensional data is performed on the basis of the corresponding points designated by the user.

However, according to the above-mentioned conventional apparatus, the user has to designate corresponding points for the registration among plural sets of three-dimensional data. This process is extremely troublesome.

Furthermore, there is no method for confirming whether proper images have been taken or not for all-around surface of the object Q1 when three-dimensional data input is performed. Accordingly, if the plural three-dimensional data are not continuous having proper overlaps, or if there is some lack of data, it is difficult to make proper corresponding points between three-dimensional data. In that case, accuracy of the registration between the three-dimensional data may be deteriorated. In the worst case, it is necessary to take images again.

SUMMARY OF THE INVENTION

The object of the present invention is to provide a method and an apparatus that can input three-dimensional data of an object easily, quickly and correctly, and enables to obtain a composite image of the object for all-around surface or a predetermined area without any lack.

According to a first aspect of the present invention, a three-dimensional data input method is provided, which uses a three-dimensional data input apparatus that is constructed to input the three-dimensional data of an object displayed on a monitor screen by shooting the object. The three-dimensional data input method comprises the steps of generating image data of the three-dimensional shape model in accordance with the three-dimensional data inputted from a part of the object, the image corresponding to the shape of the three-dimensional data; displaying the image of the three-dimensional shape model on the monitor screen as a guide image for framing; performing the framing so that the guide image is overlapped on the image of the object image that corresponds to the guide image; and shooting the object after the framing performed.

According to a second aspect of the present invention, a three-dimensional data input apparatus is provided, which is used for obtaining three-dimensional data of an object by shooting the object. The three-dimensional data input apparatus comprises a monitor for displaying the object; an image generator for generating a three-dimensional model image of the object in accordance with the three-dimensional data of the object obtained by the shooting; and a display controller for displaying the three-dimensional model image as a guide image on the monitor for framing.

According to a third aspect of the present invention, a three-dimensional data input method is provided, which uses a three-dimensional data input apparatus that includes a monitor screen for confirming an object and is constructed to input the three-dimensional data of the object by shooting the object. The three-dimensional data input method comprises the steps of displaying an image of a three-dimensional shape model having a shape that is substantially identical to the shape of the object as a guide image for framing on the monitor screen; framing in accordance with the guide image; and shooting the object after the framing is performed.

According to a fourth aspect of the present invention, a three-dimensional data input method is provided, which uses a three-dimensional data input apparatus that includes a monitor screen for confirming an object and is constructed to input the three-dimensional data of the object by shooting the object. The three-dimensional data input method comprises the steps of memorizing an attribute information in a memory, the attribute information being about data of a three-dimensional shape model having a shape that is substantially the same as the shape of the object and a position for observing the three-dimensional shape model; displaying the image of the three-dimensional shape model as a guide image for framing on the monitor screen in accordance with the attribute information; and framing so that the image of the input portion is overlapped on the guide image for shooting the object after the framing is performed.

According to a fifth aspect of the present invention, a three-dimensional data input apparatus is provided, which is used for obtaining three-dimensional data of an object by shooting the object. The three-dimensional data input apparatus comprises a monitor for displaying the object; a first memory for memorizing an attribute information about data of a three-dimensional shape model having a shape that is similar to the shape of the object and a position for observing the three-dimensional shape model; and a display controller for displaying the image of the three-dimensional shape model as a guide image for scaling on the monitor in accordance with the attribute information.

BRIEF DESCRIPTION OF THE DRAWINGS

FIG. 1 is a diagram showing a configuration of a measurement system utilizing a three-dimensional camera according to the present invention.

FIG. 5 is a diagram for explaining a process of generating a monitor image and a guide image by an overlapping image generating portion according to a first embodiment of the present invention.

FIG. 7 is a flowchart showing an operation and a process of inputting the three-dimensional data according to the first embodiment of the present invention.

FIG. 8 is a diagram for explaining a process of generating a monitor image and a guide image by an overlapping image generating portion according to a second embodiment of the present invention.

FIG. 10 is a flowchart showing an operation and a process of inputting the three-dimensional data in a first inputting method according to the second embodiment of the present invention.

DESCRIPTION OF THE PREFERRED EMBODIMENTS

Figure 2A:
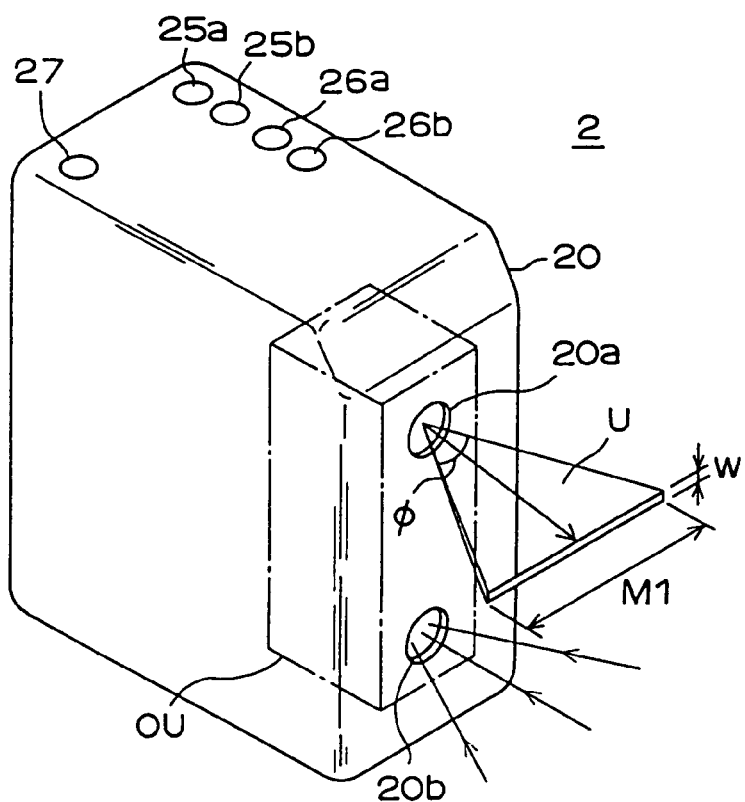
FIGS. 2A and 2B are diagrams showing an appearance of the three-dimensional camera.
Figure 2B:
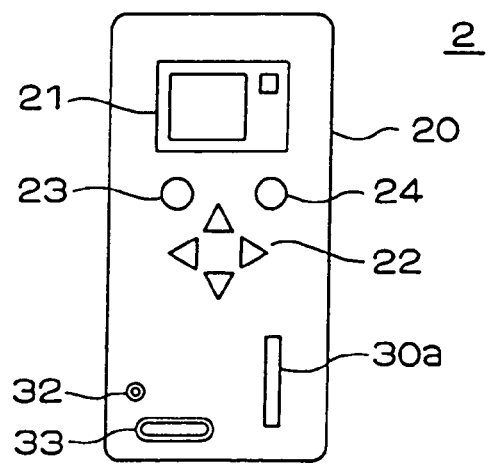

FIG. 1 is a diagram showing a configuration of a measurement system 1 utilizing a three-dimensional camera 2 according to the present invention. FIGS. 2A and 2B are diagrams showing an appearance of the three-dimensional camera 2.

As shown in FIG. 1, the measurement system 1 includes a three-dimensional camera 2 and a host 3.

The three-dimensional camera 2 is a portable type three-dimensional data input apparatus for three-dimensional measurement utilizing the slit light beam projection method, which inputs three-dimensional data (distance data) by taking images of the object Q to be inputted, and calculates and outputs data that are a basis of determining the three-dimensional shape of the object Q in accordance with the three-dimensional data.

The host 3 is a computer system including a CPU 3a, a display 3b, a keyboard 3c and a mouse 3d. Data can be transferred by online or a removable recording medium 4 between the three-dimensional camera 2 and the host 3. The recording medium 4 includes a magneto-optic disk (MO), a mini disk (MD) and a memory card.

The host 3 performs an operational process calculating coordinates of sampling points using triangulation techniques on the basis of the three-dimensional data given by the three-dimensional camera 2 and a paste process (combination process). Software for the processes is installed in the CPU 3a.

As shown in FIG. 2A, the three-dimensional camera 2 has a light irradiation window 20a and a light reception window 20b on the front surface of a housing 20. The light irradiation window 20a is arranged at the upper portion of the light reception window 20b. A slit light beam (a laser beam having a slit-like section with predetermined width w) U is emitted by an optical unit OU inside the housing 20 and passes through the light irradiation window 20a toward the object Q. The radiation angle φ of the slit light beam U in the longitudinal direction M1 is fixed. A part of the slit light beam U reflected by the surface of the object Q passes through the light reception window 20b and enters the optical unit OU. The optical unit OU has a biaxial adjustment mechanism for adjusting relationship between the light irradiation axis and the light reception axis.

The upper surface of the housing 20 is provided with zooming buttons 25a, 25b, manual focusing button 26a, 26b, and a shutter button 27.

Furthermore, as shown in FIG. 2B, the rear surface of the housing 20 is provided with a finder 21, a cursor button 22, a select button 23, a cancel button 24, an analog output terminal 32, a digital output terminal 33 and a slot 30a for a recording medium 4.

The finder 21 is an image display device having a monitor screen such as a liquid crystal display. On the finder 21, a monitor image QP and a guide image GP are displayed as a feature of the present invention. The monitor image QP and the guide image GP will be explained in detail later. Furthermore, operation procedure information that gives indications to the user what to do the next in each operation step using characters and marks is displayed. In addition, a distance image (a light and shade image) is displayed, which express the three-dimensional data of the shot portion by light and shade.

The buttons 22–24 on the rear surface are used for setting shooting mode or others. The analog output terminal 32 outputs a two-dimensional image signal of the object Q in the format such as NTSC. The digital output terminal 33 is a SCSI terminal, for example.

Next, the function of the three-dimensional camera 2 will be explained.

Figure 3:
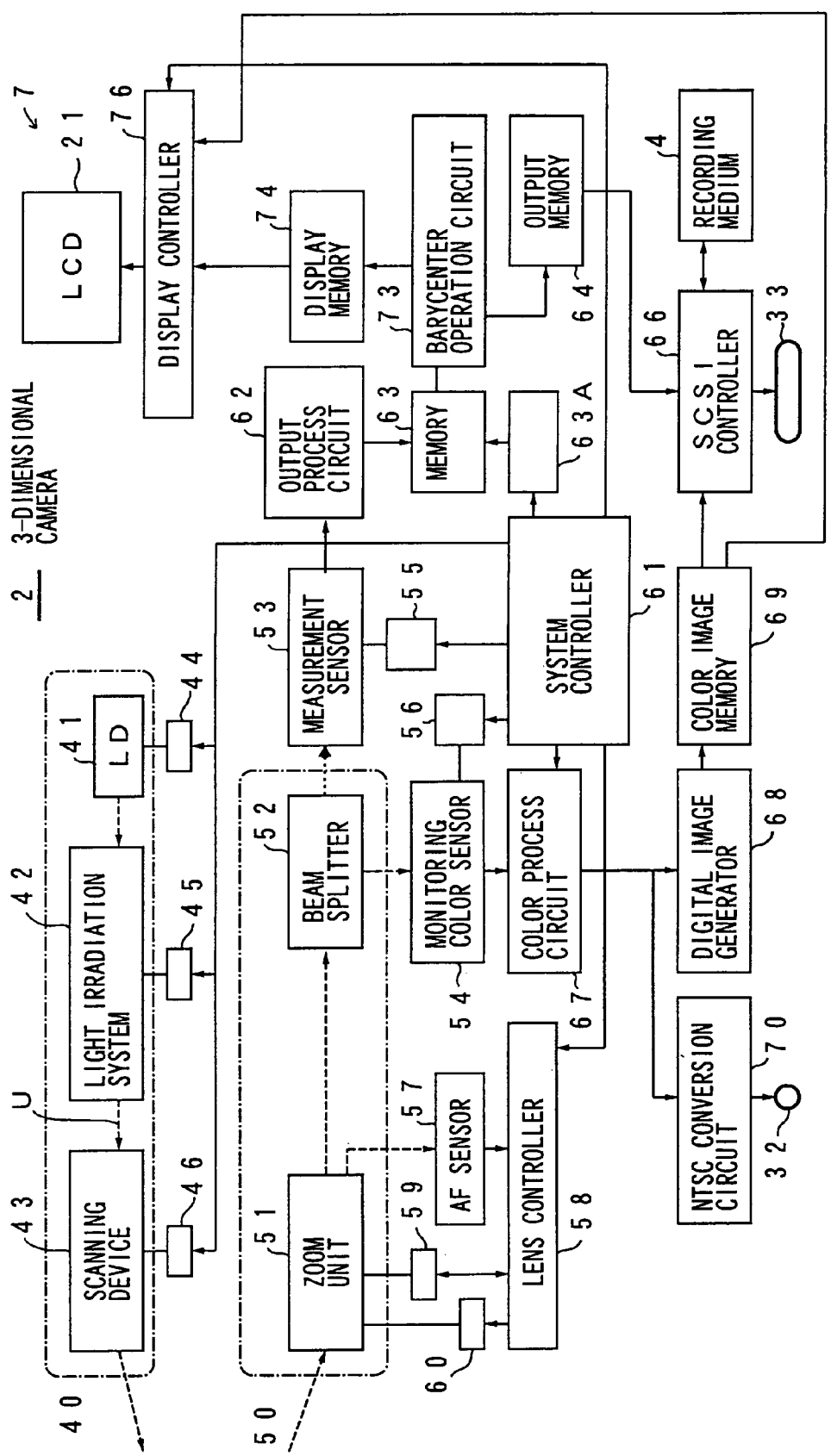
FIG. 3 is a block diagram showing a functional configuration of the three-dimensional camera.

FIG. 3 is a block diagram showing a functional configuration of the three-dimensional camera 2. Full line arrows indicate flows of electric signals and broken line arrows indicate flows of light in FIG. 3.

As shown in FIG. 3, the three-dimensional camera 2 includes two optical systems 40, 50 for light irradiation and reception that make up the above-mentioned optical unit OU. In the optical system 40, a semiconductor laser (LD) 41 emits a laser beam having wavelength of 685 nm, which passes through a light irradiation lens system 42 and becomes the slit light beam U to be deflected by a galvanomirror (scanning device) 43. A driver 44 of the semiconductor laser 41, a drive system 45 of the light irradiation lens system 42 and a drive system 46 of the galvanomirror 43 are controlled by a system controller 61.

In the optical system 50, the light beam condensed by a zooming unit 51 is divided by a beam splitter 52.

The light beam having a wavelength within the oscillation wavelength band of the semiconductor laser 41 enters a measurement sensor 53. A light beam having a wavelength within the visible band enters a monitoring color sensor 54. The measurement sensor 53 and the monitoring color sensor 54 are CCD area sensors. The measurement sensor 53 and the monitoring color sensor 54 output shooting information of the object Q and image information, respectively.

The zooming unit 51 has a zoom lens (not shown). This zoom lens is moved between the minimum focal length point and the maximum focal length point along the shooting direction, so that the three-dimensional data can be inputted in various resolution values. Furthermore, a part of the incident light beam is used for auto focusing (AF). The AF function is achieved by an AF sensor 57, a lens controller 58 and a focusing drive system 59. A zooming drive system 60 is provided for electric zooming.

Next, principal flows of electric signals in the three-dimensional camera 2 will be explained.

The shooting information of the measurement sensor 53 is transferred to an output process circuit 62 in synchronization with a clock signal given by the driver 55.

The output process circuit 62 includes an amplifier for amplifying a photoelectric conversion signal of each pixel outputted by the measurement sensor 53 and an A/D conversion portion for converting the photoelectric conversion signal into 8-bit received light signal. The received light signal obtained by the output process circuit 62 is temporarily memorized by a memory 63 and is transferred to a barycenter operation circuit 73. The address assignment is performed by a memory control circuit 63A. The barycenter operation circuit 73 calculates data to be a basis for calculating a three-dimensional shape in accordance with the received light signal that was inputted, which is outputted to an output memory 64. Furthermore, the barycenter operation circuit 73 generates a distance image that corresponds to the shape of the object Q and outputs it to a display memory 74. The data stored in the output memory 64 are outputted from the digital output terminal 33 via a SCSI controller 66, or are outputted to a recording medium 4. The distance image stored in the display memory 74 is displayed on the finder 21 via a display controller 76.

The imaging information obtained by the monitoring color sensor 54 is transferred to a color process circuit 67 in synchronization with a clock signal given by the driver 56. After the color process, the imaging information is outputted online via an NTSC conversion circuit 70 and the analog output terminal 32, or is stored in the color image memory 69 after digitized by a digital image generator 68. The imaging information stored in the color image memory 69 is output online from the digital output terminal 33 via the SCSI controller 66, or is written into the recording medium 4. Furthermore, the imaging information is displayed on the finder 21 as a monitor image QP via the display controller 76.

The system controller 61 gives instructions to the display controller 76 for displaying operation procedure information on the finder 21. A model data memory 75, the color image memory 69, the display controller 76, the system controller 61 and the finder 21 make up the overlapping image generating portion 7.

Using the three-dimensional camera 2 having the above-mentioned configuration and functions, three-dimensional data of the object Q for all-around surface or a predetermined area can be inputted.

Figure 4A:
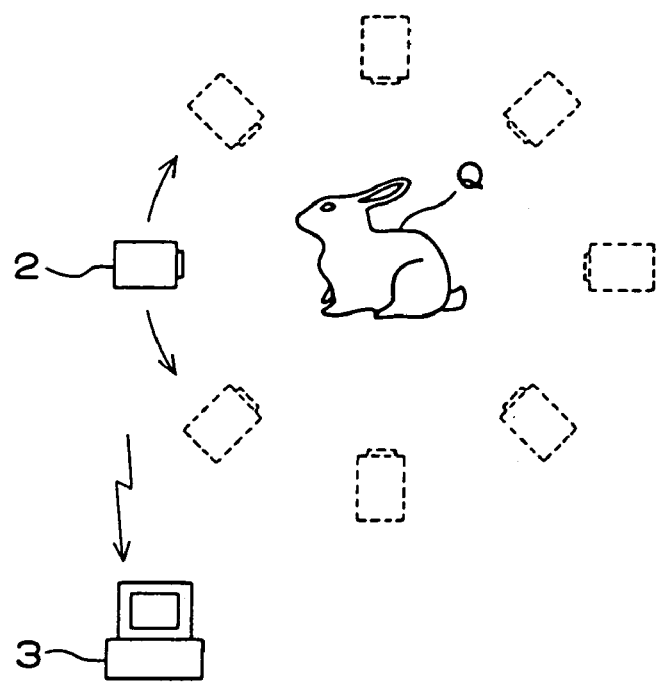
FIGS. 4A and 4B are diagrams showing a concrete method of inputting three-dimensional data of all-around surface or a predetermined area of an object using the three-dimensional camera.
Figure 4B:
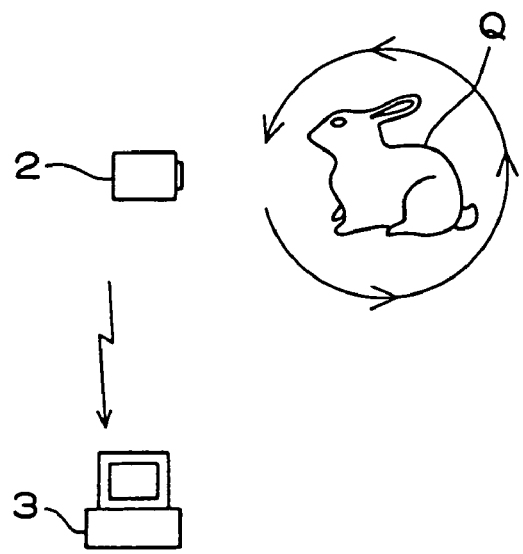

FIGS. 4A and 4B are diagrams showing a concrete method of inputting three-dimensional data of all-around surface or a predetermined area of an object Q using the three-dimensional camera 2.

In the method shown in FIG. 4A, the user moves the three-dimensional camera 2 around the object Q for inputting after changing the shooting condition. In the method shown in FIG. 4B, the object Q is moved for inputting after changing the shooting condition. In addition, the three-dimensional camera 2 can be attached to a predetermined arm, which is moved so as to change the position for shooting the object Q.

Next, the monitor image QP and the guide image GP in a first embodiment of the present invention will be explained with reference to FIG. 5 and FIGS. 6A–6C.

Figure 6A:
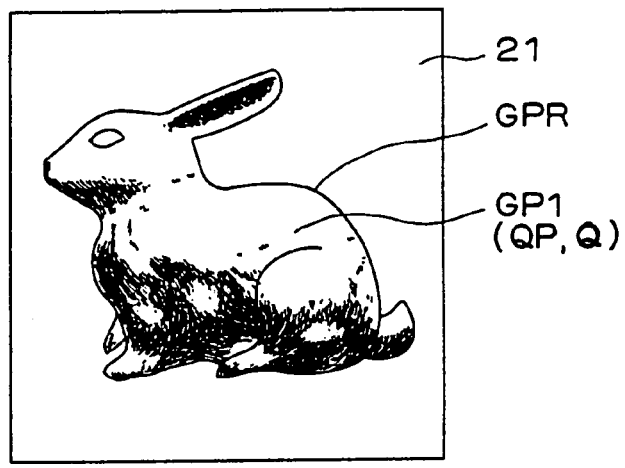
FIGS. 6A–6C are diagrams showing a monitor image and a guide image of an object displayed on a finder according to the first embodiment of the present invention.
Figure 6B:
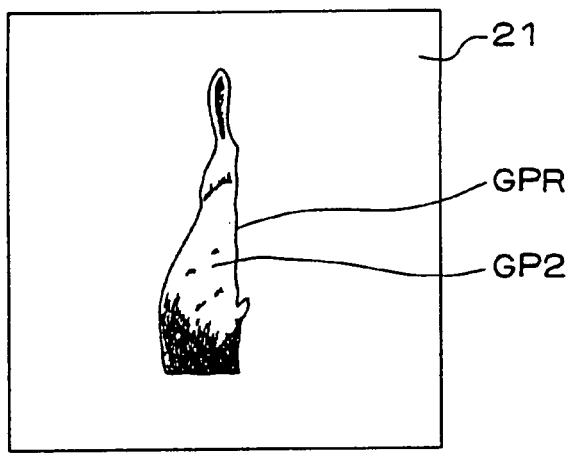
Figure 6C:
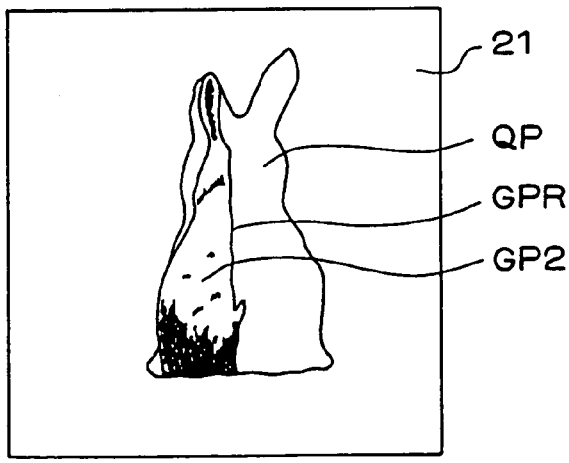

FIG. 5 is a diagram for explaining a process of generating the monitor image QP and the guide image GP by an overlapping image generating portion 7. FIGS. 6A–6C are diagrams showing the monitor image QP and the guide image GP of an object Q displayed on a finder 21.

In FIG. 5 and FIGS. 6A–6C, the monitor image QP is a color image for monitoring the portion of the object 0 to which the user directs the view line of the three-dimensional camera 2 for inputting three-dimensional data, and is generated from the imaging information stored in the color image memory 69.

The guide image GP gives information to the user position and how the object Q should be shot for inputting three-dimensional data of all-around surface or a predetermined area of the object Q. The guide image GP is generated from object shape data TD as shown in FIG. 5.

The object shape data TD are three-dimensional data of the input portion of the object Q. In the present embodiment, the left side body of a rabbit is illustrated as an example.

The object shape data TD are processed such as wire frame, shading, texture mapping or coloring. The coloring process is performed for easy discrimination of the monitor image QP from the image processed by wire frame, shading, texture mapping or coloring. The coloring process generates blue, green, red or other color, for example. Furthermore, the ratio of densities of two overlapping images can be changed to any value by changing mixing ratio of the monitor image QP and the guide image GP so that the user can observe easiest. These processes can facilitate overlapping of the guide image GP and the monitor image QP. The process can be selected in accordance with user's desire. In the present embodiment, an example is shown with processed by texture mapping.

The user can rotate (change the posture of) the object shape data TD or zoom the same so that the guide image GP becomes the state viewed from a desired direction. Thus, the guide image GP is changed. The user can determine the next shooting position with reference to this guide image GP. Hereinafter, if it is necessary to distinguish the guide image GP from others by its displayed shape, a suffix number is added in such way as "GP1" or "GP2."

The method for inputting the three-dimensional data using the monitor image QP and the guide image GP will be explained with reference to FIG. 5 and FIGS. 6A–6C.

First, the user takes an image of the object Q from one direction. For example, the left half body of the rabbit is shot from the right direction. The three-dimensional data of the left half body of the rabbit are obtained by the shooting. The obtained three-dimensional data are displayed on the finder 21 as the guide image GP1 as shown in FIG. 6A.

Next, the user rotates the guide image GP1 (object shape data TD) in the right direction viewed from the above, for example, so that the guide image GP2 that is the state of the object viewed from the rear side as shown in FIG. 6B.

On this occasion, the right edge area GPR of the object shape data TD is displayed on the finder 21. Thus, an overlapping area is secured for combining the object shape data TD obtained by the first shooting and the object shape data TD obtained by the second shooting. If a color of the edge area to be the overlapping area is different from the other area, the user can observe easily.

Next, as shown in FIG. 6C, framing is performed so that the guide image GP2 overlaps the portion of the monitor image QP corresponding to the guide image GP2.

As shown in FIG. 4, either the three-dimensional camera 2 or the object Q can be moved for framing. By performing zooming or by moving the three-dimensional camera 2, various resolutions can be used for inputting. For example, a high resolution is used for inputting detail data required to a portion such as a face, while a low resolution can be used for inputting a portion such as a back side whose shape is not changed so rapidly. Thus, unnecessary increase of data can be avoided.

After framing, a shutter button 27 is pushed for the second shooting. In the second shooting, the rabbit is shot at the back side.

By the similar operation, the guide image GP2 is changed sequentially to the guide image GP3, GP4, . . . (not shown), so that the all-around surface of the object is shot. Thus, three-dimensional data of the object for all-around surface are inputted.

The generation of the guide image GP3, GP4, . . . from the third time is performed by the following method, for example.

(1) The guide image GP is generated from the image that was obtained by the last shooting.
(2) The guide image GP is generated by using all images obtained by the previous shooting.
(3) The guide image GP is generated by using any image selected from all images obtained by the previous shooting.

Thus, the sequential change of the guide image GP can be performed by a manual mode performed in accordance with the user's desire or by an automatic mode performed by the program in accordance with a predetermined order. If the manual mode is selected, a mouse or other device can be used for operation.

With reference to the guide image GP, the three-dimensional data of the object can be inputted easily, quickly and correctly. Furthermore, registration of the plural obtained three-dimensional data can be performed easily with high accuracy, so that a composed image of all-around surface or a predetermined area of the object can be obtained easily without omission.

FIG. 7 is a flowchart showing an operation and a process of inputting the three-dimensional data.

The object is shot from an appropriate position as a first view point, so that the first three-dimensional data are inputted (#1). A finder display view point is determined in the coordinate system upon inputting the first three-dimensional data (#2). A guide image GP1 is displayed in accordance with the first three-dimensional data at the first view point (#3). The guide image GP1 becomes a guide image GP2 by automatic or user designated rotation and zooming. The guide image GP2 is overlapped on the monitor image QP from the next view point, i.e., the second view point (#4). After the overlapping is succeeded, the second three-dimensional data are inputted (#5). A parameter for converting the second three-dimensional data into the coordinate system of the first three-dimensional data is determined. The three-dimensional data overlapped on the finder 21 for inputting are data of each coordinate system. The conversion is required between these coordinate systems. The registration of the three-dimensional data means a conversion into one of the coordinate systems. Two methods for the registration can be used as explained below (#6). A coordinate conversion is performed to the second three-dimensional data using the determined parameter (#7) and the initial registration is completed (#8). A fine adjustment is performed by ICP process for further registration with high accuracy (#9).

The ICP is a method of minimizing a total distance between corresponding points by making the nearest point the corresponding point. The detail of the ICP is explained in "A method of registration of 3-D shapes" (P. Besl and N. McKay, IEEE Transactions on Pattern Analysis and Machine Intelligence, 12(2): 239–256, 1992).

Next, the two methods for registration mentioned in (#6) will be explained.

[The First Registration Method]

The following explanation uses the parameters below.

Pt: view point position when generating the guide image GP

Vt: view line direction when generating the guide image GP

Ut: upward vector when generating the guide image GP

Ft: focal distance when generating the guide image GP

St: distance to the noted point when generating the guide image GP

Fa: focal distance when shooting

Sa: shooting distance

Pa: view point position when shooting

Va: view line direction when shooting

Ua: upward vector when shooting

Pa': view point position after coordinate conversion

Va': view line direction after coordinate conversion

Ua': upward vector after coordinate conversion

In the method explained here, the view point position Pa when shooting is determined for the registration. When generating the guide image GP displayed on the finder 21, the view point position Pt and the view line direction Vt are set.

The view line direction Va and the view point position Pa when shooting the object Q while overlapping the monitor image QP on the guide image GP on the finder 21 are as follows. Namely, the view line direction Va is the direction same as the view line direction Vt (see the expression (3) below), and the view point position Pa is moved forward and backward in the same direction as the view line direction Vt.

Since the lens information (focal length) at shooting is obtained, the shooting distance Sa is determined so that the image scaling ratio becomes the same as the guide image GP. Thus, the moving distance (St−Sa) along the view line direction Va (=Vt) can be calculated and the view point position Pa can be derived as the following equation (4). Namely, since $$Ft/St = Fa/Sa \quad (1),$$

the shooting distance Sa is derived from the following equation (2):

$$Sa = (Fa \times St)/Ft \quad (2).$$

Furthermore, since $$Va = Vt \text{ and } Ua = Ut \quad (3),$$

the view point position Pa at shooting is derived from the following equation (4):

$$Pa = Pt + (St - Sa) \times Vt \quad (4).$$

The three-dimensional data obtained from each direction are moved in parallel in accordance with the view point position Pa and are rotated in accordance with the view line direction Va, so as to convert it into the coordinate system of the original three-dimensional data used for generating the guide image GP. The parallel movement quantity T for the coordinate conversion into the coordinate system of the original three-dimensional data is derived from the following equation (5).

$$T = Pa' - Pa \quad (5)$$

The view line direction Va' after the coordinate conversion and the upward vector Ua' after the coordinate conversion can be expressed in the equations (6) and (7) using Va and Ua and a rotation matrix R.

$$Va' = R \times Va \quad (6)$$

$$Ua' = R \times Ua \quad (7)$$

The three-dimensional data obtained by the parallel movement quantity T and the rotation matrix R from each direction are converted into the data of the coordinate system of the original three-dimensional data so as to perform the registration.

Overlapping operation generates the relative movement of the three-dimensional camera 2 to the object Q. The three-dimensional data inputted from plural positions are converted into the data of the coordinate system of the first shooting, in accordance with the movement. Thus, the registration is performed.

As explained above, the three-dimensional data inputted from plural positions are inputted with high accuracy of registration by overlapping the monitor image QP on the guide image GP. Therefore, a post registration is not required.

Thus, the host 3 performs pasting process on the basis of the three-dimensional data from plural positions with high accuracy of registration. Therefore, the pasting process in the host 3 can be performed in high speed and high accuracy.

[The Second Registration Method]

In this method, the registration is achieved utilizing the fact that the overlapping portion of the three-dimensional data is known.

The following explanation uses the parameters below.

Pti: corresponding points of data that were shot first

Pai: corresponding points of data that was shot after registration on the finder T: parallel movement quantity R: rotation matrix indicating rotation movement Concerning points in the overlapping area on the finder 21, the nearest point on this two-dimensional image is the corresponding point. The registration is performed by coordinate conversion such that the distance of the corresponding point on three-dimension becomes the minimum.

The coordinate conversion that minimizes the distance of the corresponding point can be obtained by determining the parallel movement quantity so that the barycenter positions of the corresponding points are identical, and by obtaining the rotation movement using the least-squares method. The following equations (8) and (9) is used.

$$T = \left( \sum_i Pti - \sum_i Pai \right) / N \quad (8)$$

The rotation matrix R is determined so as to minimize J.

$$J = \sum_i |Pti - R \times (Pai - T)|^2 \quad (9)$$

The detail of this calculation method is explained in "The representation, recognition and locating of 3-D objects," Faugeras and Hebert, 1986 O. Faugeras and M. Hebert, International Journal of Robotics Research 5(3): 27–52, 1986.

The coordinate conversion of each point Pi of the second three-dimensional data is performed using the parallel movement quantity T and the rotation matrix R obtained as mentioned above, on the basis of the following equation (10).

$$P'i = R \times (Pi - T) \quad (10)$$

The above-explained coordinate conversion enables the registration of the first three-dimensional data and the second three-dimensional data.

In the above-explained embodiment, the guide image GP and the monitor image QP are displayed on the finder 21 that is integrated to the three-dimensional camera 2. However, they can be displayed on a finder separated from the three-dimensional camera 2 or on a display 3b of the host 3.

In the above-explained embodiment, a see-through display device utilizing a half mirror can be used as the finder 21. In this case, power consumption of the three-dimensional camera 2 can be reduced.

According to the above-explained embodiment, the guide image GP is generated on the basis of the three-dimensional data of the shot object Q, so the effort of premaking the guide image GP can be saved and the memory for storing the guide image GP can be minimized.

Next, the monitor image QP and the guide image GP in a second embodiment of the present invention will be explained with reference to FIG. 8 and FIGS. 9A–9B. The rabbit as the object in the first embodiment is replaced with a head portion of a human as the object Q in this embodiment.

The guide image GP gives the user the information about from which position and how the object Q should be shot for inputting three-dimensional data of all-around surface or a predetermined area of the object Q. Such information is generated from model data MD and attribute information AJ as shown in FIG. 8.

The model data MD is three-dimensional shape model data having substantially the same shape as the object to be inputted. The model data MD a standard shape model of each of plural kinds such as a head of human (including a face), a human body, an animal, a car, a statue, an earthenware or a bell-shaped bronze vessel, whose shape is known and can be standardized. The model data MD are stored in the model data memory 75 by each kind.

The user can select the model data MD in accordance with the kind of the object Q to be inputted by a predetermined operation. Data generated from the three-dimensional data inputted beforehand by the three-dimensional camera 2 or data produced by CG technique on a computer can be used as the model data MD.

The model data MD are processed such as wire frame, shading, texture mapping or coloring. The coloring process is performed for easy discrimination of the monitor image QP from the image processed by wire frame, shading, texture mapping or coloring. The coloring process generates blue, green, red or other color, for example. Furthermore, the ratio of densities of two overlapping images can be changed to any value by changing mixing ratio of the monitor image QP and the guide image GP so that the user can observe easiest. These processes can facilitate overlapping of the guide image GP and the monitor image QP. The process can be selected in accordance with user's desire. In the present embodiment, an example processed by texture mapping is shown.

The attribute information AJ is header data accompanying the model data MD. The attribute information AJ gives the indication about from which position and how the object Q should be shot for inputting three-dimensional data of all-around surface or a predetermined area of the object Q. The attribute information AJ includes a shooting direction, a shooting angle, and the number of shots. The guide image GP is generated from the model data MD in accordance with the attribute information AJ.

Furthermore, the attribute information AJ can give an instruction of inputting with high resolution utilizing zooming function for a part such as eyes and a nose that require particularly detail data when the object Q is a human head. The attribute information AJ can also give an instruction of inputting with low resolution, i.e., with less data for a part such as a cheek or a head whose shape does not change so rapidly.

According to the attribute information AJ, the model data MD after process such as the wire frame are displayed on the finder 21 as a predetermined guide image GP. Hereinafter, if it is necessary to distinguish the guide image GP from others by its displayed shape, a suffix number is added in such way as "GP1" or "GP2."

[The First Input Method]

The method for inputting the three-dimensional data using the monitor image QP and the guide image GP1 will be explained with reference to FIG. 8 and FIGS. 9A–9B.

First, the user selects the model data MD corresponding to the kind of the object Q to be inputted. The selected model data MD are read out of the model data memory 75 in accordance with the instruction by the system controller 61 and are displayed on the finder 21 as the guide image GP1.

Figure 9A:
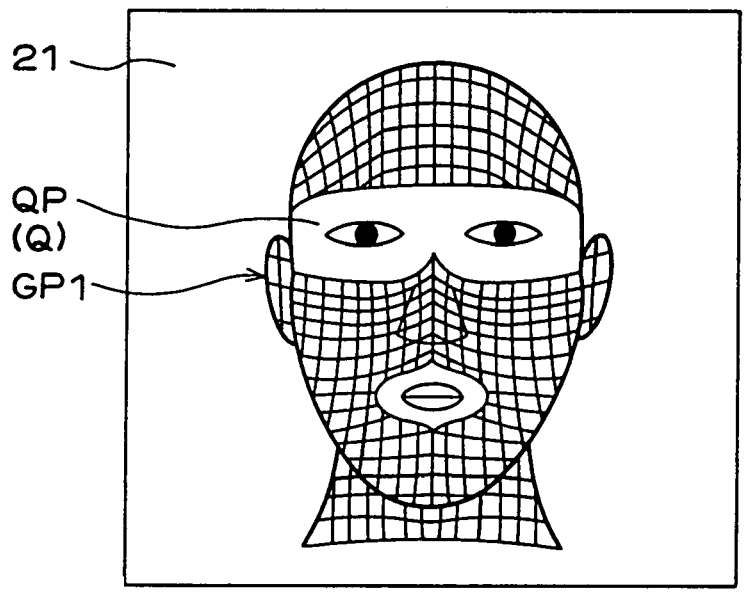
FIG. 9 is a diagram showing a monitor image and a guide image of an object displayed on a finder according to the second embodiment of the present invention.

In FIG. 9A, the guide image GP1 is instructing the user to shoot the object Q from the front. The user does framing of the object Q so that the monitor image QP is overlapped on the guide image GP exactly. As shown in FIG. 4, either the three-dimensional camera 2 or the object Q can be moved for framing. By performing zooming or by moving the three-dimensional camera 2, various resolutions can be used for inputting. For example, a high resolution is used for inputting detail data required to a portion such as eyes and a nose, while a low resolution can be used for inputting a portion such as a cheek and a head whose shape is not changed so rapidly. Thus, unnecessary increase of data can be avoided. After overlapping, the shutter button 27 is pushed so that the first three-dimensional data are inputted.

After inputting the first three-dimensional data, the guide image GP1 is changed to the guide image GP2. The guide image GP2 gives the instruction about from which position the object Q should be shot the next time. The next shooting is performed in accordance with this instruction so that the registration can be performed with high accuracy.

Figure 9B:
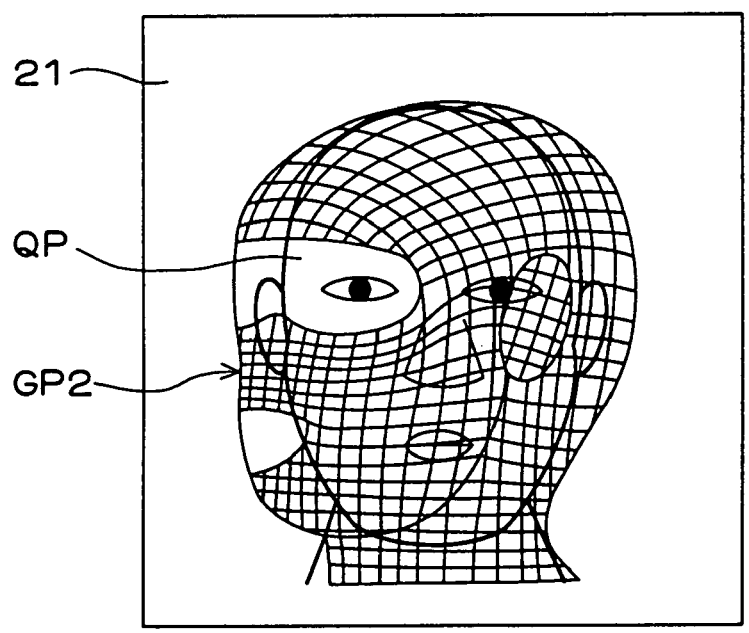

In FIG. 9B, the guide image GP2 instructs to shoot the object Q obliquely from the left direction next. The user does the framing of the object Q so that the monitor image QP is overlapped on the guide image GP2. Namely, the relative position of the object Q to the three-dimensional camera 2 is changed so that the monitor image QP overlaps the guide image GP2. When the monitor image QP agrees the guide image GP2, the shutter button 27 is pushed for inputting the second three-dimensional data. In the same way, the positions for shooting are sequentially instructed to the user by the guide image GP. The user performs the inputting sequentially in accordance with each instruction of the guide image GP.

In FIGS. 9A–9B, the guide image GP gives only the instruction about from which direction the head portion should be shot. However, another instruction can be given about inputting the detail data of eyes and a nose with high accuracy by displaying the enlarged guide image GP thereof.

Thus, the sequential instruction of the guide image GP can be given automatically by program. Furthermore, instead of the automatic sequential instruction, the contents of the attribute information AJ can be selected manually and the guide image GP is displayed in accordance with the selected order.

The inputting on the basis of the guide image GP makes it possible to input the three-dimensional data of the object easily, quickly, and correctly. Furthermore, the registration of the plural sets of shot three-dimensional data can be performed easily and precisely, so the composed image of the object for all-around surface or a predetermined area can be obtained easily. Furthermore, the composed image without omission can be obtained easily by setting the attribute information AJ properly so that all of the necessary portions of the object are shot.

If the composed image has a lack point, the data can be compensated by interpolation process. In this case, the first generated model data MD, the corrected model data MD or the three-dimensional data obtained by the previous shooting can be used.

Furthermore, the peripheral portion of the inputted three-dimensional data whose reliability is low can be omitted from use and display.

FIG. 10 is a flowchart showing an operation and a process of inputting the three-dimensional data in a first inputting method.

The currently captured object Q is displayed on the finder 21 as the monitor image QP (#1). The guide image GP1 corresponding to the object Q is displayed on the finder 21 (#2). The framing is performed so that the monitor image QP is overlapped on the guide image GP1 (#3). The view point position for the finder display is determined on the coordinate system of the guide image GP1 displayed on the finder 21 (#4). The view point at this time is determined as "the first view point." The first three-dimensional data are inputted from the first view point (#5).

The next guide image GP2 is displayed (#6). The framing is performed so as to overlap the displayed guide image GP2 (#7), and the second three-dimensional data are inputted (#8). A parameter for converting the coordinate system of the second three-dimensional data into the coordinate system of the first three-dimensional data is determined (#9). Namely, the three-dimensional data inputted with overlapping on the finder 21 are data of each coordinate system, so the conversion between the coordinate systems is necessary. The registration of the three-dimensional data means a conversion into one of the coordinate systems. The method of the registration is the same as explained in the first embodiment. The coordinate conversion of the second three-dimensional data is performed using the determined parameter (#10), and the initial registration is completed (#11). A fine adjustment is performed by ICP process for further registration with high accuracy (#12).

The movement quantity of each instruction of the guide image GP is predetermined by the attribute information PD. The relative movement quantity of the three-dimensional camera 2 to the object Q is determined by the overlapping. The plural sets of three-dimensional data inputted from plural positions are converted into data of the coordinate system of the first shooting in accordance with the movement quantity. Thus, the registration can be performed. As explained above, the three-dimensional data inputted from plural positions are inputted with high accuracy of registration by overlapping the monitor image QP on the guide image GP. Therefore, a post registration is not required.

Thus, the host 3 performs pasting process on the basis of the three-dimensional data from plural positions with high accuracy of registration. Therefore, the pasting process in the host 3 can be performed in high speed and high accuracy.

[The Second Input Method]

Even if the kind of the object Q to be inputted is the same, the shape thereof can be a little different. For example, each human head has its unique feature such as round, long or protruding back. Furthermore, a head of an adult is different in size from that of a child. As a result, the prepared guide image GP can be substantially different from the shape or the size of the object Q, so that the overlapping cannot be performed properly.

In the second input method, the model data MD is corrected by matching the guide image GP with the monitor image QP, and the scale adjustment is performed so that the scale of the monitor image QP and the scale of the guide image GP are matched with each other.

Figure 11:
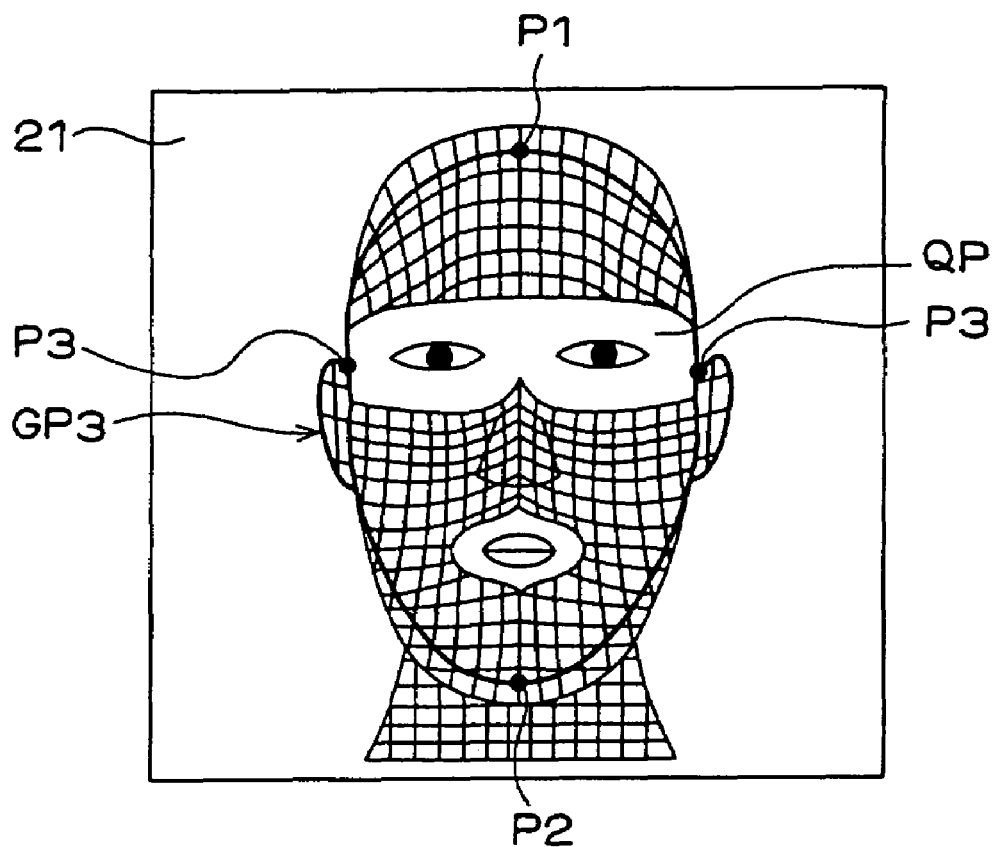
FIG. 11 is a diagram showing a monitor image and a guide image of an object displayed on a finder in a second inputting method according to the second embodiment of the present invention.

FIG. 11 is a diagram showing a monitor image QP and a guide image GP in a second inputting method.

In FIG. 11, the guide image GP3 that is larger than the monitor image QP in the vertical direction is displayed on the finder 21. First, the user does framing of the object Q so that the monitor image QP is overlapped substantially on the guide image GP3. Next, matching of the guide image GP3 with the monitor image QP is performed. Points such as a parietal portion P1, an end of a chin P2 and a base of an ear P3 are given to the model data MD as the attribute information AJ, and a point on the monitor image QP corresponding to each of the points is designated. Another method can be adopted, in which any corresponding point is designated.

Then, the ratio of the movement quantity in the vertical direction and that in the horizontal direction between the matched points is averaged. The scale change is performed for the entire of the model data MD, i.e., the guide image GP. Thus, the guide image GP4 after scale adjustment of the aspect ratio (not shown) is generated.

Then, the framing of the object Q is performed so that the monitor image QP is overlapped on the guide image GP4 for inputting the first three-dimensional data. After inputting the first three-dimensional data, the next guide image GP is displayed in the same way as in the first input method. In the same way as in the input of the first three-dimensional data, the rough overlapping, the scale adjustment by the matching and the input of the three-dimensional data are repeated in accordance with the instruction of the guide image GP.

Thus, since the three-dimensional data are inputted in accordance with the instruction of the guide image GP in which the scale is adjusted to the shape of the object Q, the input is performed with high accuracy of the registration. Therefore, even if the shape of the object Q is a little different from others, a composed image with high accuracy can be obtained.

In the same way as in the first input method, if the composed image has a lack point, the data can be compensated by interpolation process. Furthermore, the peripheral portion of the inputted three-dimensional data whose reliability is low can be omitted from use and display.

Figure 12:
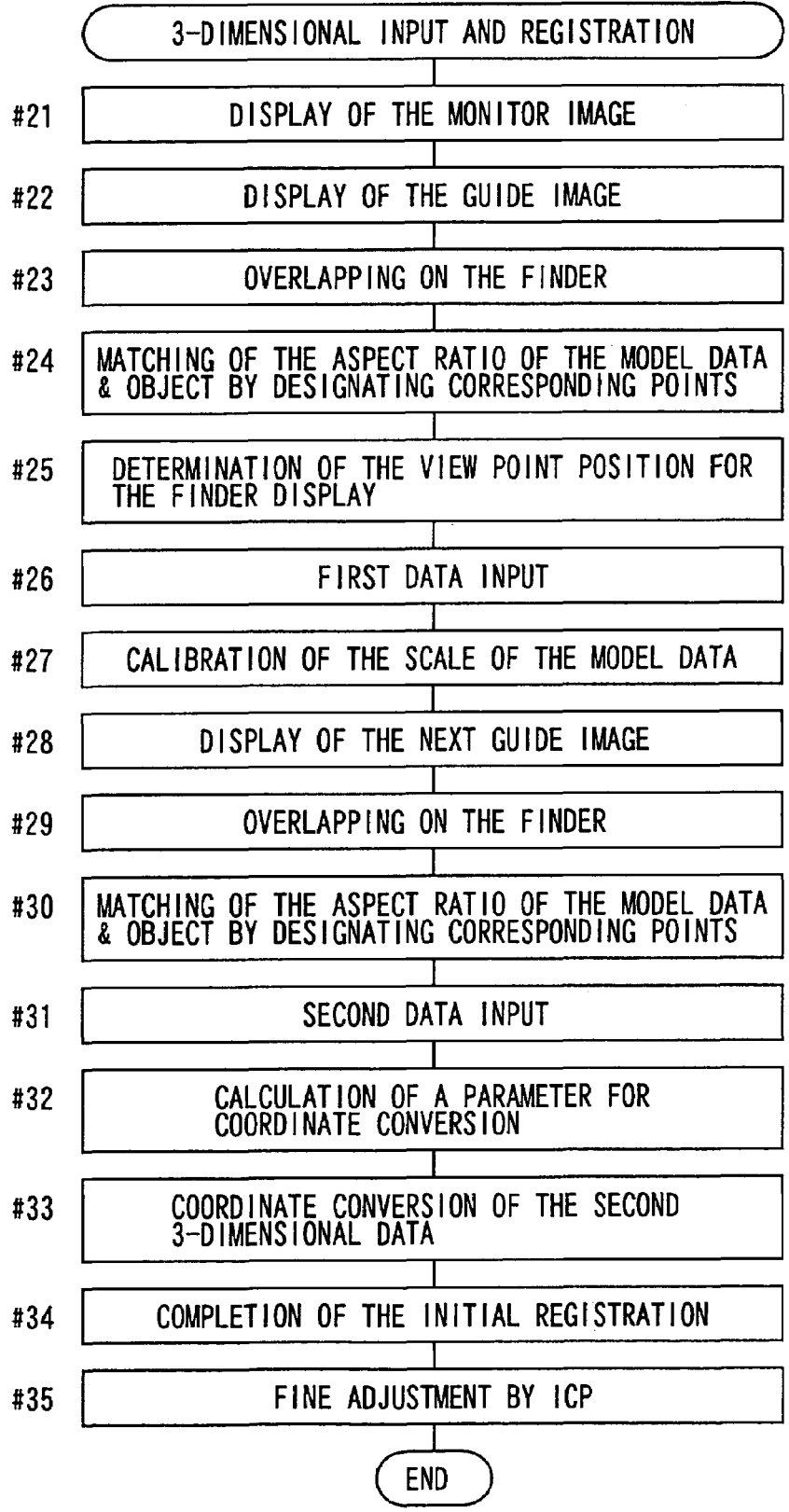
FIG. 12 is a flowchart showing an operation and a process of inputting the three-dimensional data in the second inputting method according to the second embodiment of the present invention.
Figure 13:
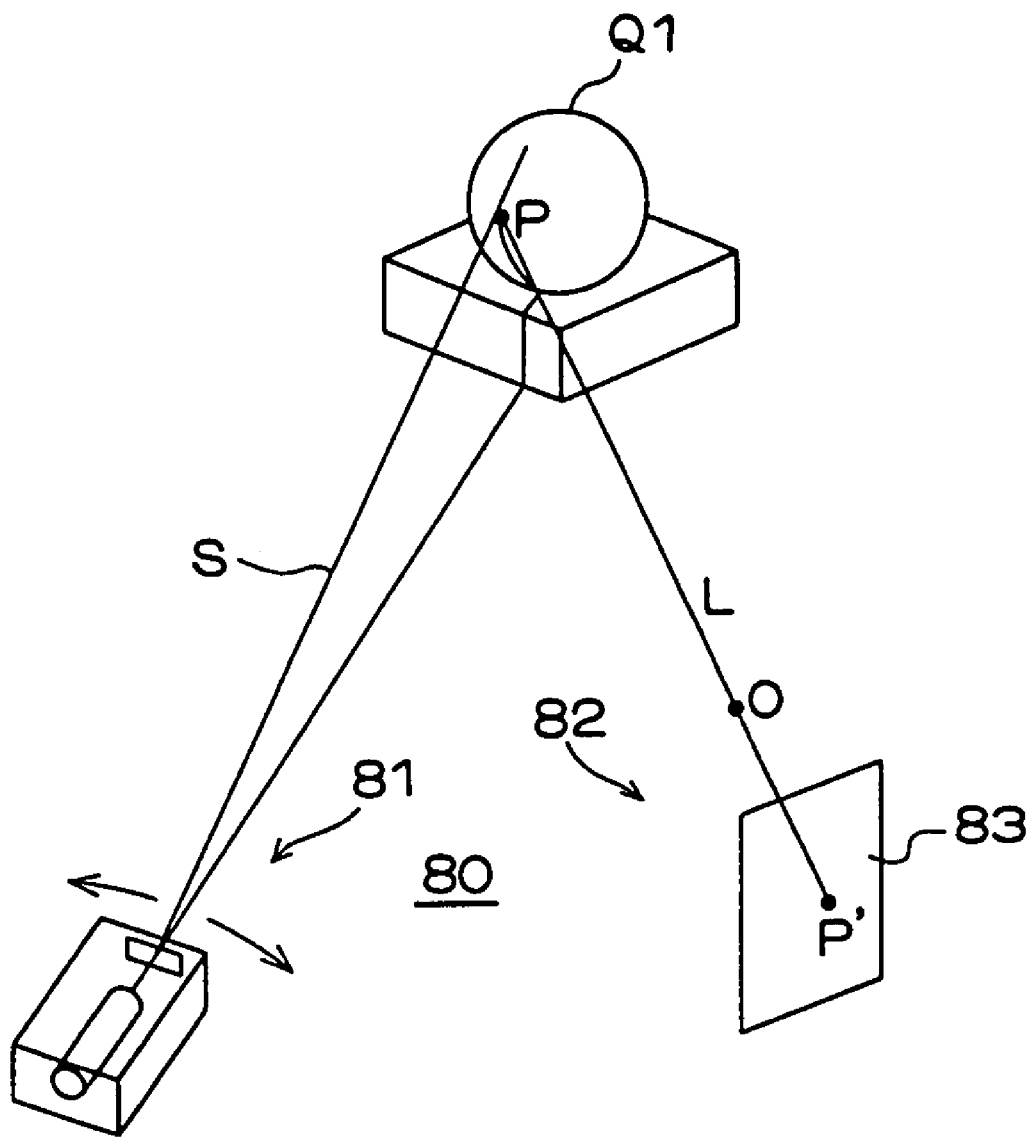
FIG. 13 a diagram showing an input principle of a three-dimensional camera utilizing the slit light projection method.

FIG. 12 is a flowchart showing an operation and a process of inputting the three-dimensional data in the second inputting method.

On the finder 21, the currently captured object Q is displayed on the finder 21 as the monitor image QP (#21). The guide image GP3 corresponding to object Q is displayed (#22). The framing is performed so that the guide image GP3 is substantially overlapped on the monitor image QP (#23). The matching of the guide image GP3 and the monitor image QP is performed. The scale adjustment of the aspect ratio of the model data MD and the object Q is performed by designating corresponding points (#24). The view point position of the finder display is determined in the coordinate system of this position (#25). The view point at this time is determined as "the first view point." The first three-dimensional data are inputted from the first view point (#26). A calibration is performed for the scale adjustment of the real size of the object Q and the model data MD (#27).

The next guide image GP4 is displayed (#28). The framing is performed so that the guide image GP4 is substantially overlapped on the monitor image QP (#29), and the scale adjustment of the aspect ratio of the model data MD and the object Q is performed by designating corresponding points (#30). The second three-dimensional data are inputted by overlapping the monitor image QP on the guide image GP5 (not shown) after the scale adjustment exactly (#31). A parameter for converting the coordinate system of the second three-dimensional data into the coordinate system of the first three-dimensional data is determined (#32). A coordinate conversion of the second three-dimensional data is performed using the determined parameter (#33). In the same way as in the first input method, the initial registration is completed (#34) and a fine adjustment is performed by ICP process for further registration with high accuracy (#35).

The step 24 and the step 30 mentioned above correspond to the matching means and the scale agreement means.

In the above-explained embodiment, the guide image GP and the monitor image QP are displayed on the finder 21 that is integrated to the three-dimensional camera 2. However, they can be displayed on a finder separated from the three-dimensional camera 2 or on a display 3b of the host 3.

In the above-explained embodiment, a see-through display device utilizing a half mirror can be used as the finder 21. In this case, power consumption of the three-dimensional camera 2 can be reduced.

In the above-explained embodiment, the configuration, the shape, the position, the circuit and the process of each part or the whole of the measurement system 1 and the three-dimensional camera 2 can be changed in accordance with the tenor of the present invention.

According to the present invention, the three-dimensional data of the object can be inputted easily, quickly and correctly. The composed image of the all-around surface or a predetermined area of the object can be obtained easily without any omission.

What is claimed is:

1. A three-dimensional data input method for inputting three-dimensional data using a three-dimensional data input apparatus that is constructed to input the three-dimensional data of an object displayed on a monitor screen by shooting the object, the method comprising the steps of:

generating image data of a three-dimensional shape model in accordance with first three-dimensional data inputted from a part of the object, the image corresponding to the shape of the first three-dimensional data;

changing a posture of the image as the first three-dimensional data for specifying unmeasured portions;

displaying on the monitor screen the image of the three-dimensional shape model as a guide image for framing;

performing a framing so that the guide image is overlapped on an image of the object that corresponds to the guide image;

performing shooting the object after the framing in order to obtain second three-dimensional data; and performing registration of the first three dimensional data and the second three-dimensional data by converting coordinates of the first three-dimensional data and the second three-dimensional data then pasting the first three-dimensional data and the second three-dimensional data together so that resulting data are new three-dimensional data.

2. A three-dimensional data input apparatus for obtaining three-dimensional data of an object by shooting the object, the apparatus comprising:

a monitor for displaying images;

an image generator for generating a three-dimensional model image of the object in accordance with first three-dimensional data of the object obtained by the shooting and changing a posture of the image as the first three-dimensional data for specifying unmeasured portions; and a display controller for displaying on the monitor the three-dimensional model image as a guide image for framing, together with an image of the object that corresponds to the guide image, wherein during framing, the monitor is controlled to display the guide image overlapping on the image of the object that corresponds to the guide image, after framing, shooting the object is performed in order to obtain second three-dimensional data, and registration of the first three dimensional data and the second three-dimensional data is performed by converting coordinates of the first three-dimensional data and the second three-dimensional data then pasting the first three-dimensional data and the second three-dimensional data are pasted together so that resulting data are new three-dimensional data.

3. The three-dimensional data input apparatus according to claim 2, further comprising a memory for memorizing the three-dimensional data of the object obtained by the shooting.

4. The three-dimensional data input apparatus according to claim 3, wherein the image generator generates the three-dimensional model image in accordance with the data memorized in the memory.

5. A three-dimensional data input method of using a three-dimensional data input apparatus that is constructed to input three-dimensional data of a portion of an object displayed on a monitor screen by shooting the object, the method comprising the steps of:

displaying on the monitor screen an image of a three-dimensional shape model having a shape substantially identical to the object as a guide image for framing, the image of the three-dimensional shape model being based on a predetermined three-dimensional shape model data;

changing a posture of the image as first three-dimensional data for specifying unmeasured portions;

framing so that the image of the input portion is overlapped on the guide image;

shooting the object after the framing is performed in order to obtain second three-dimensional data, and performing registration of the first three dimensional data and the second three-dimensional data by converting coordinates of the first three-dimensional data and the second three-dimensional data and pasting the first three-dimensional data and the second three-dimensional data together so that resulting data are new three-dimensional data.

6. The three-dimensional data input method according to claim 5, further comprising the steps of matching the image of the input portion with the guide image so that the scale of the guide image agrees with the scale of the object.

7. The three-dimensional data input method according to claim 5, wherein the shooting is performed for plural positions different from each other for the object.

8. The three-dimensional data input method according to claim 5, wherein the image of the three-dimensional shape model is retrieved from the memory.

9. The three-dimensional data input method according to claim 8, wherein a plurality of the image of the three-dimensional shape model is memorized.

10. A three-dimensional data input method of using a three-dimensional data input apparatus that is constructed to input the three-dimensional data of a portion of an object displayed on a monitor screen by shooting the object, the method comprising the steps of:
   memorizing attribute information in a memory, the attribute information being about data of a three-dimensional shape model having a shape that is substantially the same as the shape of the object and a position for observing the three-dimensional shape model;
   displaying on the monitor screen, in accordance with the attribute information, the image of the three-dimensional shape model as a guide image for framing in order to perform registration for a subsequent shooting;
   changing a posture of the image as first three-dimensional data for specifying unmeasured portions;
   framing so that the image of the input portion is overlapped on the guide image;
   shooting the object after the framing is performed in order to obtain second three-dimensional data; and
   performing registration of the first three dimensional data and the second three-dimensional data by converting coordinates of the first three-dimensional data and the second three-dimensional data then pasting the first three-dimensional data and the second three-dimensional data together so that resulting data are new three-dimensional data.

11. The three-dimensional data input method according to claim 10, further comprising the step of matching the image of the input portion with the guide image, so that the scale of the guide image agrees with the scale of the object.

12. The three-dimensional data input method according to claim 10, wherein the shooting is performed for plural positions different from each other for the object.

13. A three-dimensional data input apparatus for obtaining three-dimensional data of an object by shooting the object, the apparatus comprising:
   a monitor for displaying the object;
   a first memory for memorizing attribute information about data of a three-dimensional shape model having a shape that is similar to the shape of the object and a position for observing the three-dimensional shape model and changing a posture of the image as first three-dimensional data for specifying unmeasured portions; and
   a display controller for displaying on the monitor, in accordance with the attribute information, the image of the three-dimensional shape model as a guide image for scaling in order to perform registration for a subsequent shooting to obtain second three-dimensional data, wherein
   after obtain the second three-dimensional data, registration of the first three dimensional data and the second three-dimensional data is performed by converting coordinates of the first three-dimensional data and the second three-dimensional data then pasting the first three-dimensional data and the second three-dimensional data are pasted together so that resulting data are new three-dimensional data.

14. The three-dimensional data input apparatus according to claim 13, further comprising a processor for matching the image of the object with the guide image and scale changing means for changing the scale of the guide image in accordance with the matching.

15. The three-dimensional data input apparatus according to claim 13, further comprising a second memory for memorizing three-dimensional data of the shot object.

16. The three-dimensional data input apparatus according to claim 15, wherein the image generator generates a three-dimensional model image in accordance with the data memorized in the second memory.

* * * * *